United States Patent
Van Phan et al.

(10) Patent No.: US 9,066,325 B2
(45) Date of Patent: Jun. 23, 2015

(54) METHODS AND APPARATUS FOR CONTROLLING QUALITY OF SERVICE PARAMETERS IN A RADIO NETWORK

(75) Inventors: Vinh Van Phan, Oulu (FI); Sami Hakola, Kempele (FI); Timo Koskela, Oulu (FI); Gilles Charbit, Hampshire (GB); Esa Tuomaala, Helsinki (FI); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 284 days.

(21) Appl. No.: 13/700,149

(22) PCT Filed: May 28, 2010

(86) PCT No.: PCT/EP2010/057468
§ 371 (c)(1),
(2), (4) Date: Feb. 20, 2013

(87) PCT Pub. No.: WO2011/147468
PCT Pub. Date: Dec. 1, 2011

(65) Prior Publication Data
US 2013/0157679 A1     Jun. 20, 2013

(51) Int. Cl.
*H04W 72/00* (2009.01)
*H04W 76/02* (2009.01)
(Continued)

(52) U.S. Cl.
CPC ............ *H04W 76/023* (2013.01); *H04W 28/24* (2013.01); *H04W 76/043* (2013.01)

(58) Field of Classification Search
CPC ... H04W 76/023; H04W 24/08; H04W 28/24; H04W 24/02; H04W 72/0406; H04W 28/16; H04W 28/26; H04W 28/18; H04W 76/043; H04L 12/5695; H04L 47/805; H04L 45/22
USPC .................. 455/452.1, 41.1–41.3, 450–455; 709/227, 228; 370/329
See application file for complete search history.

(56) References Cited

U.S. PATENT DOCUMENTS 7,831,252 B2 * 11/2010 Shang et al. ................. 455/436
8,295,871 B2 * 10/2012 Axnas et al. ................. 455/522
(Continued)

FOREIGN PATENT DOCUMENTS

EP        2 012 480 A1     1/2009
WO   WO 2004/077920 A2    9/2004
(Continued)

OTHER PUBLICATIONS

IEEE 802.11—2001 (Revision of IEEE Std 802.11—1999); "IEEE Standard for Information technology—Telecommunications and information exchange between systems—Local and metropolitan area networks—Specific requirements; Part 11: Wireless LAN Medium Access Control (MAC) and Physical Layer (PHY) Specifications"; Jun. 12, 2007; whole document; IEEE Computer Society; New York, NY, USA.

*Primary Examiner* — Allahyar Kasraian
(74) *Attorney, Agent, or Firm* — Harrington & Smith (57) ABSTRACT

A method, apparatus, and computer program for controlling device-to-device connections and associated quality-of-service parameters are presented. The quality-of-service parameters of an end-to-end connection through a plurality of different radio access networks are aligned in connection with changing a communication mode to a direct device-to-device connection.

19 Claims, 3 Drawing Sheets

(51) Int. Cl.
*H04W 28/24* (2009.01)
*H04W 76/04* (2009.01)

(56) References Cited

U.S. PATENT DOCUMENTS

| | | | |
|---|---|---|---|
| 8,504,052 B2 * | 8/2013 | Hakola et al. | 455/452.1 |
| 2007/0153747 A1 * | 7/2007 | Pan et al. | 370/338 |
| 2008/0259853 A1 | 10/2008 | Ito | 370/329 |
| 2009/0073945 A1 | 3/2009 | Seok | 370/338 |
| 2009/0310541 A1 * | 12/2009 | Watanabe | 370/328 |
| 2010/0062787 A1 * | 3/2010 | Yoshiuchi et al. | 455/452.2 |

FOREIGN PATENT DOCUMENTS

WO  WO 2004/103008 A1  11/2004
WO  WO 2005/053347 A1   6/2005

* cited by examiner

METHODS AND APPARATUS FOR CONTROLLING QUALITY OF SERVICE PARAMETERS IN A RADIO NETWORK

FIELD

The invention relates to the field of cellular radio telecommunications and, particularly, to controlling quality of service parameters in a radio network.

BACKGROUND

Integration of new network topologies into a cellular network gains more and more attraction both in industry and academy of cellular radio telecommunications. Recent developments encompass direct communication between terminal devices operating in a cellular network when the terminal devices are close to each other. An object in such direct device-to-device communication is to use valuable radio resources in the most efficient manner. As an application example of device-to-device (D2D) communication, the terminal devices may communicate directly with each other under the control of the cellular network by sharing the radio resources with cellular users, i.e. the terminal devices communicating data through the cellular network.

Terminal devices about to establish a D2D connection may be served by different operators and, thus, different radio access networks and even different radio access technologies. The terminal devices may also have individual end-to-end services (e.g. web browsing) at the same time as the common D2D connection service. Furthermore, the radio access networks of individual terminal devices may set quality-of-service parameters differently for respective radio bearers and, thus, may control the same service differently, which may result in unreliable performance of the D2D connection.

BRIEF DESCRIPTION

According to an aspect of the present invention, there are provided methods as specified in claims 1 and 6.

According to another aspect of the present invention, there are provided apparatuses as specified in claims 10 and 15.

According to another aspect of the present invention, there is provided an apparatus as specified in claim 19.

According to yet another aspect of the present invention, there is provided a computer program product embodied on a computer readable distribution medium as specified in claim 19.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
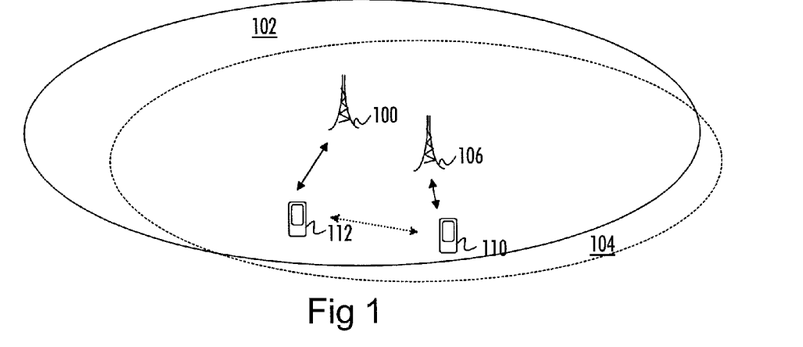
FIG. 1 illustrates an example of a communication scenario to which embodiments of the invention may be applied.

FIG. 1 illustrates a communication scenario to which embodiments of the invention may be applied. Referring to FIG. 1, terminal devices (user equipment, UE) 110, 112 belong to different radio access networks (RANs). A base station 100 and a cell 102 covered by the base station 100 represent a first RAN serving a first UE 112, while base station 106 and a cell 104 covered by the base station 106 represent a second RAN serving a second UE 110. The first and second RAN may be RANs of different network operators and/or different radio access technologies, and the coverage areas of the first and second RAN overlap essentially, which is typical in multi-operator, multi-radio-access-technology communication environment. The RANs may support any radio access technology which supports device-to-device connections, i.e. connections where the terminal devices may communicate directly with each other without intermediate radio access network routing the data. The device-to-device connection may be used between end nodes of an end-to-end connection, or it may be used between an end node and a relay node relaying the end-to-end connection between the end-nodes. Any other device-to-device connections avoiding the need for data routing through any RAN are also possible. A given RAN may, however, control the direct device-to-device (D2D) connection. The radio access technology may be based on any current radio access technology, e.g. UMTS (Universal Mobile Telecommunication System) including its long-term evolution versions (LTE, LTE-Advanced), but the radio access technology may also include GSM (Global System for Mobile Communications) including GPRS (General Packet Radio Service) extensions, and IEEE 802.11 (Wireless Local Area Network) with appropriate support for D2D connections.

Figure 2:
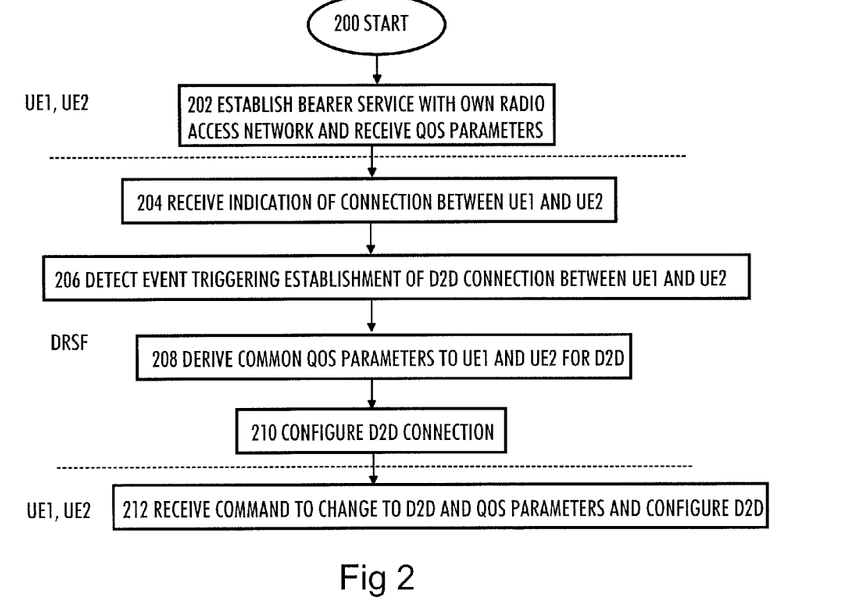
FIG. 2 illustrates processes for carrying out alignment of quality-of-service parameters according to embodiments of the invention.

Let us now consider a scenario where the UEs 110, 112 belonging to different RANs and located close to each other establish an end-to-end communication connection with each other. Close to each other means that the UEs 110, 112 are in such proximity that a direct device-to-device connection is possible instead of a cellular connection routed through the respective RANs (including the base stations 100, 106) of the UEs 110, 112. FIG. 2 illustrates a flow diagram for establishing the end-to-end connection between the UEs and determining quality-of-service (QoS) parameters for the device-to-device connection. Some of the steps in the process of FIG. 2 are carried out in the UEs 110, 112, while other steps are carried out in an entity controlling device-to-device connections in a plurality of radio access networks, i.e. the entity is a common controller for device-to-device connections in multiple different RANs. Let us denote such an entity a D2D Registration Server Function (DRSF).

Referring to FIG. 2, the process starts in block 200. In block 202, each of the UEs establishes a signaling connection with its own radio access network as a part of an establishment of an end-to-end connection between the UEs. In other words, the first UE 112 establishes a signaling connection with the first RAN and the second UE 110 establishes a signaling connection with the second RAN as part of a call setup procedure of the end-to-end connection. The call setup procedure includes specifying identifiers or addresses of the UEs between which the end-to-end connection is to be established, specifying whether or not the UEs support D2D connections, and specifying a type of the connection (voice call, messaging, file transfer, etc.) so as to determine a QoS classification for the connection. The UEs also receive respective QoS parameters for the end-to-end connection from their respective radio access network. As mentioned in the Background section, the QoS parameter the UEs receive may differ from one another because different RANs may assign different QoS parameters for the same connection.

In block 204, the DRSF receives a message indicating establishment of the end-to-end connection between the UEs. The DRSF may also receive the QoS parameters assigned to each UE. In block 206, the DRSF detects an event triggering establishment of a direct D2D connection between the UEs. The triggering event may be detection that the UEs support the D2D connections and reside in cells 102, 104 having overlapping coverage areas and in a control area of the DRSF.

In block 208, the DRSF derives common quality-of-service parameters for the UEs for use in the direct device-to-device connection. In block 210, the DRSF causes transmission of a message comprising information on the derived common quality-of-service parameters for said terminal devices. Block 210 may comprise other configurations for the D2D connection, e.g. selection of a RAN to control the D2D connection, establishment of appropriate signaling bearers, etc. as will be described in more detail below.

In block 212, the UEs both receive a command to change a communication mode of the end-to-end connection to a direct device-to-device connection between the UEs. In block 212, the UEs also receive new QoS parameters for the device-to-device connection that are assigned as common QoS parameters for the device-to-device connection. In other words, the same QoS parameters are now assigned to both UEs. In block 212, the UEs configure the device-to-device connection with the newly received QoS parameters. Steps 202 and 212 are carried out in respective UEs, while steps 204 to 210 are carried out in the DRSF.

The embodiment of FIG. 2 solves the QoS parameter allocation for the D2D connection by aligning different QoS parameters different RANs have assigned to the same end-to-end connection. The result is that both UEs use common QoS parameters, which improves the performance and reliable operation of the D2D connection and an application utilizing the D2D connection.

Figure 3:
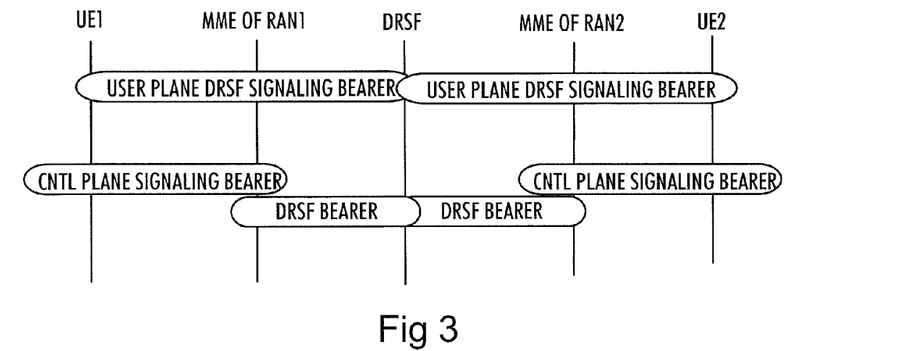
FIG. 3 illustrates exemplary signaling bearers according to embodiments of the invention.

FIG. 3 illustrates two embodiments for establishing a signaling bearer between the UE and the DRSF in connection with setting up the end-to-end connection. A first embodiment utilizes a direct user plane signaling bearer and a second embodiment utilizes a control plane signaling bearer through a control entity of a RAN serving the UE. When the UE is a terminal device of the UMTS LTE(A) system, the network entity may be a mobility management entity (MME) of the LTE network. With respect to the first embodiment illustrated in an upper portion of FIG. 3, a user plane DRSF signaling bearer is established between the UE and the DRSF. With respect to the establishment of the signaling bearer, a network address (or another identifier) of the DRSF may be advertised in the RAN serving the UE. The network address may be an IP (Internet Protocol) address of the DRSF or another address which enables an IP connection or another connection independent of the RAN or the radio access technology. The network address may be advertised in broadcast signals broadcasted by base stations (or access points) of the RAN. The network address may be comprised in a message being part of advertisement of support for D2D connections. In order to enable the advertisement, the DRSF may establish a connection with all radio access networks under the control of the DRSF so as to provide the DRSF network address and instructions to advertise the D2D connections. Upon detection of the advertisement and the network address of the DRSF, the (calling) UE may establish the signaling bearer with the DRSF as a part of the connection setup of the end-to-end connection or before the connection setup. In other words, the DRSF signaling bearer may be setup when the UE is in an idle mode. Upon establishment of the signaling bearer, the UE may communicate the connection parameters (destination address of the other UE, QoS parameters for the end-to-end connection, etc.) to the DRSF. Similarly, the other (called) UE of the end-to-end connection may establish a similar signaling bearer with the DSRF. The other signaling bearer may be initiated by the DSRF in response to the reception of the destination address from the calling UE or by the called UE in a similar manner as the calling UE did.

With respect to the second embodiment of FIG. 3, the signaling bearer with the DRSF may be established through the network entity (MME) of the RAN serving the UE. The UE may establish the signaling bearer as a part of conventional non-access stratum (NAS) signaling. The signaling bearer is a control plane signaling bearer in this case. In practice, the NAS signaling may comprise an additional information element for indicating the capability of the UE for D2D connections. Upon detection of the establishment of the end-to-end connection for the UE and reception of the information element indicating that the UE supports D2D connections, the MME establishes a DRSF bearer with the DRSF and forwards the information element to the DRSF over the DRSF bearer. Initially, the end-to-end connection may be established as a conventional cellular connection routed through the RAN serving the UE, the establishment of the connection including establishment of an (enhanced) packet service bearer between the UE and a serving gateway (S-GW) and packet data gateway (P-GW) of the RAN serving the UE. Thus, the MME may also allocate QoS parameters for the end-to-end connection in the RAN of the UE and transmit the QoS parameters to the DRSF over the DRSF bearer. The UE may select the type of the DRSF signaling bearer according to the RAN serving the UE currently. For example, if the UE is served by an IEEE 802.11 access point, a direct DRSF signaling bearer of the first embodiment may be established, but if the UE is served by an UMTS LTE RAN, the DRSF signaling bearer through a serving MME may be used. The UEs of the end-to-end connection may also use different types of DRSF signaling bearers. The direct DRSF signaling bearer may be used also in the UMTS LTE networks and, then, the DRSF signaling bearer is transparent for the MME. The MME may, however, still control the establishment of the cellular connection for the end-to-end connection, define the QoS parameters for the end-to-end connection in the RAN serving the UE, etc.

Upon reception of the notification of the establishment of the end-to-end connection between the two UEs served by the different RANs and the above-mentioned information elements for both UEs, i.e. the information that both UEs support D2D connections, the DRSF checks for a possibility of creating the D2D connection between the UEs. The DRSF may also receive identifiers of base stations or access points currently serving the UEs and, then, check a database storing base station or access point combinations that have such an overlapping coverage areas that the D2D connection is possible. Other means for determining the locations of the UEs with respect to each other are possible. One option is positioning on the basis GPS (Global Positioning System) coordinates transmitted by the UEs to the DRSF.

Figure 4:
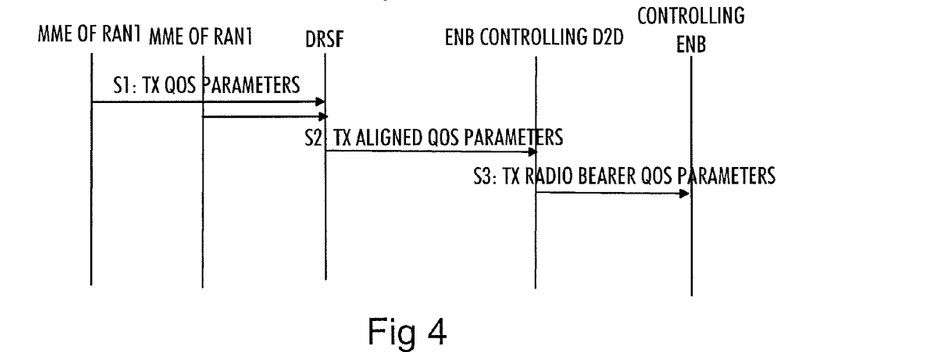
FIG. 4 illustrates alignment of the quality-of-service parameters according to an embodiment of the invention.

Upon detection of the fact that the D2D connection is possible, the DRSF initiates a selection procedure for selecting a RAN to control the D2D connection. This includes the determination of the QoS parameters for the connection. FIG. 4 illustrates a process for aligning the different QoS parameters of the UEs assigned by the different RANs. In S1, the QoS parameters assigned to the UEs for the end-to-end connection are transmitted to the DRSF over the DRSF signaling bearer described above with respect to FIG. 3. Accordingly, the QoS parameters may be transmitted by the UEs themselves or the network entities, e.g. the MME, of the serving RANs. The DRSF may analyze the received QoS parameters of the existing bearers of the UEs in respective RANs as a part of the QoS determination in S2. The DRSF may align the QoS parameters in S2 by selecting from the received QoS parameters the one with higher priority (or more strict) QoS parameters. In another embodiment, the DRSF resets the QoS parameters of both devices. In this embodiment, the analysis of the current QoS parameters of the UEs may even be omitted. When the QoS parameters comprise a plurality of different QoS parameter categories, the DRSF may select for each QoS category the higher priority QoS parameters amongst the QoS parameters of the UEs. The QoS parameters may include at least one of allocation and retention priority (ARP) indicating priority of the connection, a guaranteed bit rate (GBR) of the device-to-device connection, a quality-of-service classification index (QCI) of the device-to-device connection, and an aggregate maximum bit rate (AMBR) for the first terminal device. The ARP of the bearer is used for admission control to decide whether or not the requested bearer should be established in case of radio congestion. It also governs the prioritization of the bearer for pre-emption with respect to a new bearer establishment. After successful establishment, a bearer's ARP does not have any impact on the bearer-level packet forwarding treatment. QCI is characterized by priority, packet delay budget and acceptable packet loss rate. The QCI label for a bearer determines how it is handled in the controlling LTE base station (enhanced Node B, eNB). The priority and packet delay budget determine RLC (Radio Link Control) mode configuration, and how the scheduler in MAC (Medium Access Controller) handles packets sent over the bearer. The different QCIs in the LTE include nine QoS classes covering conversational voice, conversational video (Live Streaming), real-time gaming, non-conversational video (buffered streaming), IMS (IP multimedia sub-system) signaling, video (buffered streaming) and TCP-based traffic including www, e-mail, chat, ftp, p2p file sharing, progressive video, etc. Other QoS classifications may also be used, e.g. standard four classifications including conversational, streaming, interactive and background QoS classes. AMBR per group of bearers of a single terminal device is used for non-GBR bearers.

Figure 5:
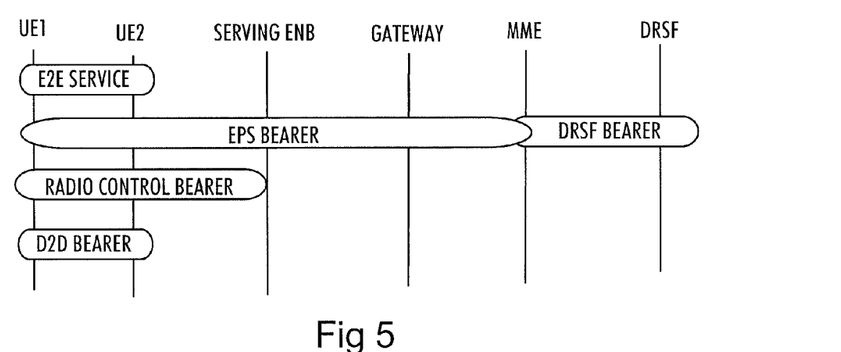
FIG. 5 illustrates exemplary bearers for device-to-device connection according to an embodiment of the invention.

Upon aligning the QoS parameters, or in parallel with the alignment, the DRSF may determine candidate base stations to control the D2D connection. The candidate base stations may be determined amongst the base stations having both UEs located in their coverage areas so that the candidate base stations may communicate with both (or all) UEs of the end-to-end connection. The DRSF may then establish a connection with the candidate base stations so as to negotiate the possibility for the candidate base stations to allocate the D2D connection in their radio resources. In other words, the DRSF negotiates about the congestion in the candidate base stations. The DRSF may also provide the candidate base stations with the aligned QoS parameters (in S3) so as to provide information on the type of the D2D connection to be established. The candidate base stations may include the base stations currently serving the UEs and base stations of other RANs. Upon selection of the base station and RAN to control the D2D connection, the DRSF configures the selected RAN and the UEs to establish appropriate control bearers and the D2D connection between the UEs. In S3, the aligned QoS parameters may be transmitted to the base station (enhanced Node B, eNB, in LTE networks) controlling the D2D connection in the negotiation stage. Additionally, the aligned QoS may be conveyed to the UEs. When the RAN controlling the D2D connection is an LTE RAN, the DRSF may transmit the QoS parameters to the MME of the RAN which may forward the QoS parameters to the controlling eNB so that the eNB may apply the QoS parameter when controlling a radio bearer of the D2D connection. The QoS parameters are applied to scheduling radio resources to the D2D connection, allocation of other radio bearers in the cell controlled by the eNB, etc. During the operation of the DRSF, the DRSF or the MME may adjust the QoS parameter settings, as considered necessary. The changed QoS parameters may then be transmitted to the controlling eNB for use when controlling the D2D connection. FIG. 5 illustrates exemplary bearers used in connection with the D2D connection. First of all, there is the end-to-end connection or service between the UEs (UE1 and UE2) which may be first established as a cellular connection and then changed to the D2D connection under the control of the DRSF. The change from the cellular connection to the D2D connection may be carried out in the establishment stage of the end-to-end connection, i.e. before any data is transferred between the UEs, provided that the UEs are in such proximity with respect to each other that the D2D connection is possible and that there is a RAN to control the D2D connection. Naturally, the cellular communication mode may be changed to the D2D communication mode during the communication over the end-to-end connection, when the DRSF detects the event triggering the change of the communication mode to the D2D connection.

In connection with the establishment of the end-to-end connection as the cellular connection, the DRSF bearer is established as described above with reference to FIG. 3. Additionally, an (enhanced) packet service (E)PS bearer is established between the UEs and respective serving gateways for data transfer and between the UEs and respective MMEs for control signaling. Upon establishment of the D2D connection, the EPS bearers with the gateways may be put on a stand by stage for use as a backup if the D2D connection suddenly breaks or its performance degrades. In an embodiment, the EPS bearers with the gateways are terminated upon establishment of the D2D connection. When the DRSF determines to change the communication mode from the D2D connection to the cellular connection, the EPS bearers with the gateways are activated. The DRSF may control the (de)activation of the EPS bearers with the gateways directly or through the MME. When changing from the D2D connection to the cellular connections, the DRSF may instruct the MMEs of respective RANs to freely select the QoS parameters for respective UEs, i.e. the QoS parameters of the end-to-end connection may again be different for the different RANs.

With respect to the D2D connection, the serving eNB establishes a radio control bearer with the UEs so as to control the radio communications over the D2D connection, including scheduling of radio resources, communication parameter (transport format) adjustments, etc. A D2D bearer is established directly between the UEs (no intermediate nodes of any RAN) for data transfer. It should be noted that each UE may also have other connections active together with the D2D connection. Those other bearers may also be transferred to the RAN controlling the D2D connection, or they may be maintained in the home RAN of the UE, depending on the implementation. A network entity in the serving RAN, MME in LTE, may signal info about new bearers being setup to individual UEs to DRSF as well as existing bearers being terminated during the active D2D connection in order to enable the DRSF to re-evaluate the QoS parameters for the UE and to re-evaluate whether a D2D communication mode or a cellular communication mode is more suitable for the UE per each common bearer. For example, if the UEs have only the common bearer(s), a D2D communication mode may be preferred. On the other hand, if both UEs have also other unique bearers, the cellular communication mode may be preferred. The DRSF may determine the QoS settings individually for each (D2D) bearer, but it may take into account other bearers of the UEs of the D2D connection. The DRSF may even instruct the MME(s) serving the UEs to change the QoS settings of the unique cellular connections of the UEs.

Figure 6:
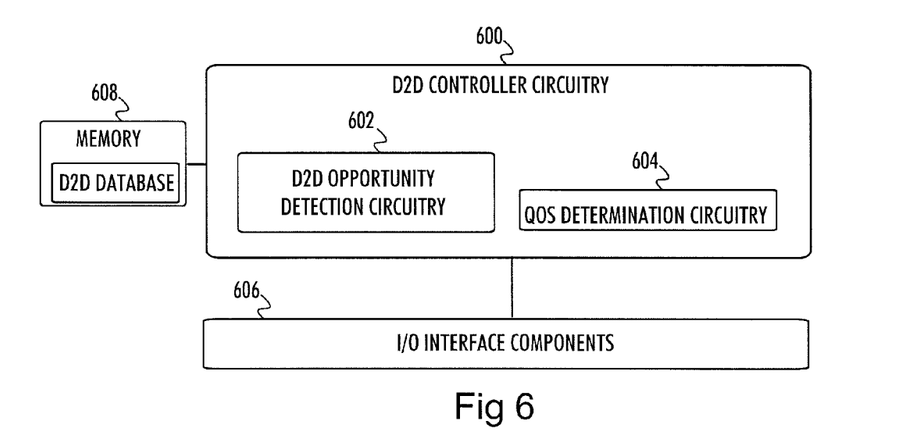
FIGS. 6 and 7 illustrate block diagrams of apparatuses according to embodiments of the invention.

FIG. 6 illustrates an embodiment of an apparatus for controlling D2D connections for a plurality of RANs. The apparatus may implement the above-described DRSF. The apparatus may form a server connected to the plurality of RANs controlled by the apparatus. The apparatus comprises input/output (I/O) interface components 606 to establish the above-mentioned signaling connections with the RANs and the UEs. The I/O interface components 606 may be configured to establish IP connections or other types of connections.

The apparatus may further comprise a memory 608 storing computer programs configuring the apparatus to perform the above-described functionalities of the DRSF. The memory 608 may also store a database storing triggering conditions for the establishment of the D2D connections. For example, the database may store combinations of those base stations of different RANs that have overlapping coverage areas. Alternatively, the database may store a parameter defining a maximum distance between the UEs for use in the selection between the cellular and D2D connection modes. The apparatus further comprises a D2D connection controller circuitry 600 operationally connected to the memory 608 and the I/O interface components 606 to control the D2D connections in the plurality of different RANs. The D2D connection controller circuitry 600 comprises a D2D opportunity detection circuitry 602 as a sub-circuitry to monitor the mobility of the UEs and to detect the opportunity for the D2D connection. The D2D may constantly monitor the base stations currently serving the UEs of the end-to-end connection routed through a plurality of cellular connections and, upon detection of a serving base station combination stored in the database and indicating the possibility for the D2D connection, the D2D opportunity detection circuitry may inform the D2D controller circuitry that the D2D triggering condition has been detected. The DRSF may be informed every time an UE of the end-to-end connection is handed over to another base station. The detection may naturally be based on another type of mobility monitoring, as described above. Upon reception of the notification about the D2D triggering, the D2D controller circuitry instructs a QoS determination circuitry 604 to align the QoS parameters of the UEs of the end-to-end connection for the D2D connection. The QoS determination circuitry 604 may then retrieve current QoS parameters of the UEs from the memory or request them from MMEs or other network elements of the RANs currently controlling the end-to-end connection. The QoS determination circuitry 604 may compare each QoS parameter of the UEs and select a QoS parameter having a higher priority. In another embodiment, the QoS determination circuitry determines the QoS parameters without consulting the current QoS parameters of the end-to-end connection. The QoS determination circuitry then outputs the determined QoS parameters to the D2D controller circuitry 600. In response to the reception of the QoS parameters for the D2D connection, the D2D controller circuitry 600 forwards the determined QoS parameters to the RAN selected to control the D2D connection. The D2D controller circuitry may also select the RAN to control the D2D connection, as described above, and control respective gateways of the currently serving RANs to deactivate current data bearer services in the RANs serving the end-to-end cellular connection. The circuitries of the D2D controller circuitry 600 may be carried out by the one or more physical circuitries or processors. In practice, the different circuitries may be realized by different computer program modules.

Figure 7:
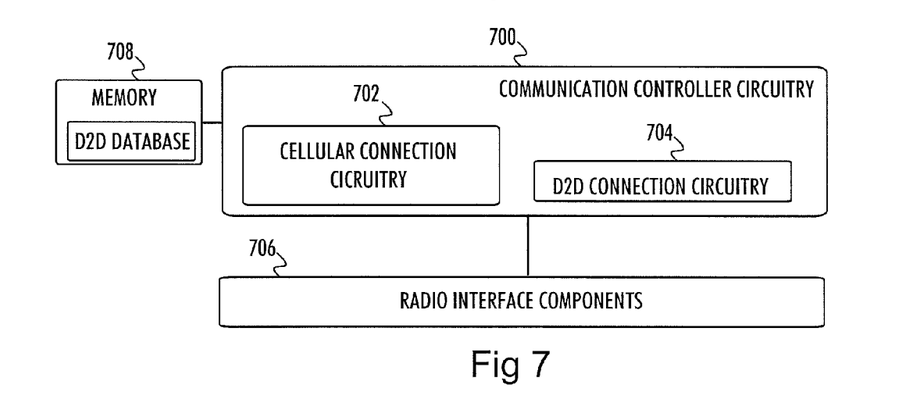

FIG. 7 illustrates an embodiment of an apparatus applicable to a terminal device. In an embodiment, the apparatus of FIG. 7 is the terminal device. The apparatus may comprise a communication controller circuitry 700 configured to control both cellular and D2D connection in the above-described manner. The communication controller circuitry may comprise a cellular connection circuitry 702 operating cellular connections routed through a RAN of the terminal device including the apparatus. The communication controller circuitry 700 further comprises a D2D connection circuitry 704 operating D2D connections of the terminal device. The D2D connection circuitry may be configured to provide control connections to the DRSF and to RANs other than the home RAN of the terminal device so as to support D2D connections controlled by the other RANs. Upon establishment of the end-to-end connection with another terminal device, the cellular connection circuitry establishes a regular cellular connection with the serving RAN. At the same time, the D2D connection circuitry may establish the direct DRSF signaling bearer with the DRSF. Alternatively, the DRSF signaling bearer may be established as a part of NAS signaling and, then, the cellular connection circuitry may be configured to add to the NAS signaling an information element indicating that the terminal device supports the D2D connections. Upon reception of the command to change the communication mode for the end-to-end connection from the cellular communication mode to the D2D communication mode, the communication controller circuitry may control the D2D connection circuitry to establish the radio control bearer with a base station of the RAN indicated in the received command and selected to control the D2D connection. Additionally, the cellular connection circuitry 702 may be configured to put the cellular bearer services on a standby state. As was the case in the apparatus of FIG. 6, the circuitries of the communication controller circuitry 700 may be carried out by one or more physical circuitries or processors. In practice, the different circuitries may be realized by different computer program modules.

The apparatus may further comprise a memory 708 storing computer programs configuring the apparatus to perform the above-described functionalities of the DRSF. The memory may also store communication parameters and other information needed for the cellular and D2D connections. The apparatus may further comprise radio interface components

706 providing the apparatus with radio communication capabilities with the different RANs. The radio interface components 706 may comprise standard well-known components such as amplifier, filter, frequency-converter, (de)modulator, and encoder/decoder circuitries and one or more antennas.

As used in this application, the term 'circuitry' refers to all of the following: (a) hardware-only circuit implementations, such as implementations in only analog and/or digital circuitry, and (b) to combinations of circuits and software (and/or firmware), such as (when applicable): (i) a combination of processor(s) or (ii) parts of processor(s)/software including digital signal processor(s), software, and memory(memories) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor (e.g. a core of a multi-core processor) and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 and 4 and in other parts of the description may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable radio telecommunication systems. As mentioned above, the present invention is also applicable to radio systems operating on unlicensed frequency bands. The protocols used, the specifications of such telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   receiving, in an apparatus controlling device-to-device connections for a plurality of radio access networks, a message indicating establishment of an end-to-end connection between a first terminal device of a first radio access network and a second terminal device of a second radio access network different from the first radio access network, wherein the end-to-end connection is assigned with a first set of quality-of-service parameters in the first radio access network and a second set of quality-of-service parameters in the second radio access network;
   detecting an event triggering establishment of a direct device-to-device wireless connection between the first terminal device and the second terminal device, wherein the direct device-to-device connection contains no intermediate radio access network between the first terminal device and the second terminal device;
   deriving common quality-of-service parameters for said terminal devices for use in the direct device-to-device connection; and
   causing transmission of a message comprising information on the derived common quality-of-service parameters for said terminal devices.

2. The method of claim 1, further comprising:
   selecting a radio access network to control the direct device-to-device connection and a network element of the determined radio access network controlling quality-of-service parameters; and
   causing the transmission of the message comprising information on the derived common quality-of-service parameters for said terminal devices to said network element.

3. The method of claim 1, wherein deriving the common quality-of-service parameters comprises:
   determining quality of service parameters of the end-to-end connection for the first terminal device in the first radio access network;
   determining quality of service parameters of the end-to-end connection for the second terminal device in the second radio access network; and
   deriving the common quality-of-service parameters from the determined quality of service parameters in the first radio access network and in the second radio access network.

4. The method of claim 3, wherein deriving the common quality-of-service parameters comprises changing at least some of the quality-of-service parameters for both first and second terminal device to achieve the common quality-of-service parameters for the device-to-device connection.

5. The method of claim 3, wherein deriving the common quality-of-service parameters comprises selecting the quality-of-service parameters of one of the first terminal device and the second terminal device as the common quality-of-service parameters for the device-to-device connection.

6. A method comprising:
   establishing, in an apparatus associated with a first terminal device of a radio access network, a signaling connection with the radio access network as part of establishment of an end-to-end connection with a second terminal device through the radio access network;
   determining quality-of-service parameters for the end-to-end connection;
   receiving a command to change a communication mode of the end-to-end connection to a direct device-to-device connection with the second terminal device, wherein the direct device-to-device connection includes no intermediate radio access network between the first terminal device and the second terminal device;
   receiving new quality-of-service parameters for the device-to-device connection, assigned as common quality-of-service parameters to the first terminal device and the second terminal device for use in for use in the device-to-device connection; and
   configuring the device-to-device connection with the newly received quality-of-service parameters.

7. The method of claim 6, further comprising:
establishing a direct signaling connection between the first terminal device and a network element controlling device-to-device connections for a plurality of radio access networks when the radio access network serving the first terminal device operates on unlicensed frequency bands;
causing transmission of an indication that the first terminal device supports direct device-to-device connections and current quality-of-service parameters of the end-to-end connection routed through the radio access network to the network element over the direct signaling connection; and
receiving the new quality-of-service parameters for the direct device-to-device connection from the network element over the direct signaling connection or over a new signaling connection dedicated for controlling the device-to-device connection.

8. The method of claim 7, further comprising:
receiving, from the radio access network, a message comprising an address of the network element; and
establishing the direct signaling connection with the network element by using the received address of the network element.

9. The method of claim 1, wherein the quality-of-service parameters of the device-to-device connection comprise at least one of allocation and retention priority indicating priority of the connection, a guaranteed bit rate of the device-to-device connection, a quality-of-service classification of the device-to-device connection, and an aggregate maximum bit rate for the first terminal device.

10. An apparatus comprising:
at least one processor; and
at least one memory including computer program code, wherein the at least one memory and the computer program code are configured, with the at least one processor, to cause the apparatus to:
control device-to-device connections for a plurality of radio access networks;
receive a message indicating establishment of an end-to-end connection between a first terminal device of a first radio access network and a second terminal device of a second radio access network different from the first radio access network, wherein the end-to-end connection is assigned with a first set of quality-of-service parameters in the first radio access network and a second set of quality-of-service parameters in the second radio access network;
detect an event triggering establishment of a direct device-to-device wireless connection between the first terminal device and the second terminal device, wherein the direct device-to-device connection contains no intermediate radio access network between the first terminal device and the second terminal device;
derive common quality-of-service parameters for said terminal devices for use in the direct device-to-device connection; and
cause transmission of a message comprising information on the derived common quality-of-service parameters for said terminal devices.

11. The apparatus of claim 10, wherein the at least one memory and the computer program code are configured, with the at least one processor, to cause the apparatus to:
determine a radio access network to control the direct device-to-device connection and a network element of the determined radio access network controlling quality-of-service parameters; and
cause the transmission of the message comprising information on the derived common quality-of-service parameters for said terminal devices to said network element.

12. The apparatus of claim 10, wherein the at least one memory and the computer program code are configured, with the at least one processor, to cause the apparatus to derive the common quality-of-service parameters by:
determining quality of service parameters of the end-to-end connection for the first terminal device in the first radio access network;
determining quality of service parameters of the end-to-end connection for the second terminal device in the second radio access network; and
deriving the common quality-of-service parameters from the determined quality of service parameters in the first radio access network and in the second radio access network.

13. The apparatus of claim 12, wherein the at least one memory and the computer program code are configured, with the at least one processor, to cause the apparatus to derive the common quality-of-service parameters by changing at least some of the quality-of-service parameters for both first and second terminal device to achieve the common quality-of-service parameters for the device-to-device connection.

14. The apparatus of claim 12, wherein the at least one memory and the computer program code are configured, with the at least one processor, to cause the apparatus to derive the common quality-of-service parameters comprising by selecting the quality-of-service parameters of one of the first terminal device and the second terminal device as the common quality-of-service parameters for the device-to-device connection.

15. An apparatus comprising:
at least one processor; and
at least one memory including computer program code, wherein the at least one memory and the computer program code are configured, with the at least one processor, to cause the apparatus to:
operate a first terminal device of a radio access network;
establish a signaling connection with the radio access network as a part of establishment of an end-to-end connection with a second terminal device through the radio access network;
determine quality-of-service parameters for the end-to-end connection;
receive a command to change a communication mode of the end-to-end connection to a direct device-to-device connection with the second terminal device, wherein the direct device-to-device connection contains no intermediate radio access network between the first terminal device and the second terminal device;
receive new quality-of-service parameters for the device-to-device connection that are assigned as common quality-of-service parameters to the first terminal device and the second terminal device for use in the device-to-device connection; and
configure the device-to-device connection with the newly received quality-of-service parameters.

16. The apparatus of claim 15, wherein the at least one memory and the computer program code are configured, with the at least one processor, to cause the apparatus to:
establish a direct signaling connection between the first terminal device and a network element controlling device-to-device connections for a plurality of radio access networks when the radio access network serving the first terminal device operates on unlicensed frequency band;

cause transmission of an indication that the first terminal device supports direct device-to-device connections and current quality-of-service parameters of the end-to-end connection routed through the radio access network to the network element over the direct signaling connection; and receive the new quality-of-service parameters for the direct device-to-device connection from the network element over the direct signaling connection or over a new signaling connection dedicated for controlling the device-to-device connection.

17. The apparatus of claim 16, wherein the at least one memory and the computer program code are configured, with the at least one processor, to cause the apparatus to:

receive, from the radio access network, a message comprising an address of the network element; and establish the direct signaling connection with the network element by using the received address of the network element.

18. The apparatus of claim 15, wherein the quality-of-service parameters of the device-to-device connection comprise at least one of allocation and retention priority indicating priority of the connection, a guaranteed bit rate of the device-to-device connection, a quality-of-service classification of the device-to-device connection, and an aggregate maximum bit rate for the first terminal device.

19. A non-transitory computer readable medium storing a program of instructions, execution of which by at least one processor configures an apparatus to at least:

receive a message indicating establishment of an end-to-end connection between a first terminal device of a first radio access network and a second terminal device of a second radio access network different from the first radio access network, wherein the end-to-end connection is assigned with a first set of quality-of-service parameters in the first radio access network and a second set of quality-of-service parameters in the second radio access network;

detect an event triggering establishment of a direct device-to-device wireless connection between the first terminal device and the second terminal device, wherein the direct device-to-device connection contains no intermediate radio access network between the first terminal device and the second terminal device;

derive common quality-of-service parameters for said terminal devices for use in the direct device-to-device connection; and transmit a message comprising information on the derived common quality-of-service parameters for said terminal devices.

* * * * *